United States Patent [19]

Rapata

[11] 4,113,340

[45] Sep. 12, 1978

[54] PROTECTIVE ELECTRICAL DEVICE

[75] Inventor: George M. Rapata, Schaumburg, Ill.

[73] Assignee: Illinois Tool Works Inc., Chicago, Ill.

[21] Appl. No.: 810,532

[22] Filed: Jun. 27, 1977

[51] Int. Cl.² ............................................. H01R 3/00
[52] U.S. Cl. ................................. 339/113 R; 174/92; 174/138 F; 339/97 P; 339/198 J
[58] Field of Search ........................... 174/92, 138 F; 339/113 R, 208, 97 P, 116 R, 116 C, 198 J

[56] References Cited

U.S. PATENT DOCUMENTS

| | | | |
|---|---|---|---|
| 3,234,498 | 2/1966 | Logan | 339/97 P |
| 3,255,399 | 6/1966 | Parks | 174/92 X |

Primary Examiner—Roy Lake
Assistant Examiner—DeWalden W. Jones
Attorney, Agent, or Firm—Jack R. Halvorsen; Robert W. Beart

[57] ABSTRACT

A compact protective electrical device for use with electrical wiring terminal blocks having a plurality of adjacently positioned elongated terminal means. The device includes a two-piece dielectric body composed of substantially identical sections which is designed to accept an electrical component associated with spaced contacts adapted to accept a variety of predetermined spacings of the terminals through end ports in the body. The device can serve as a surge protector in telephonic circuits dependent upon the type of electrical component utilized and is readily installed by finger pressure while maintaining a low profile to prevent accidental dislodgment.

10 Claims, 8 Drawing Figures

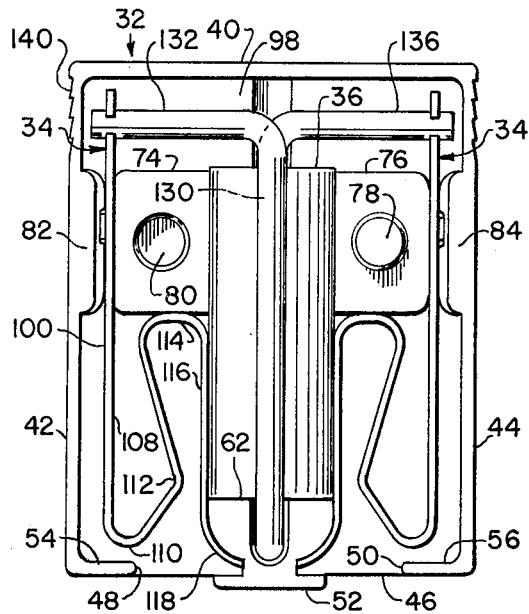
Fig.3
"M" BLOCK
"B" BLOCK
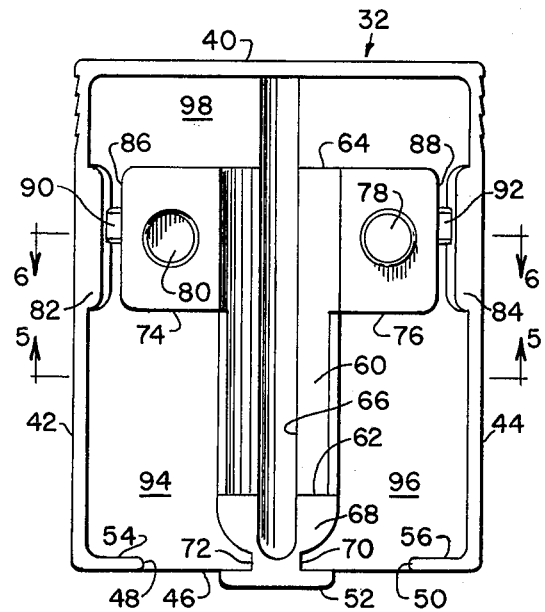
Fig.4
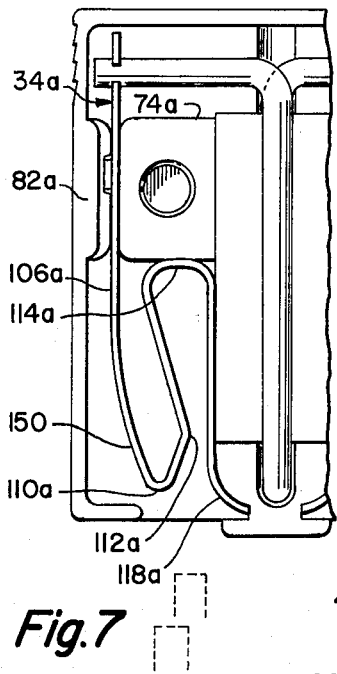
Fig.7
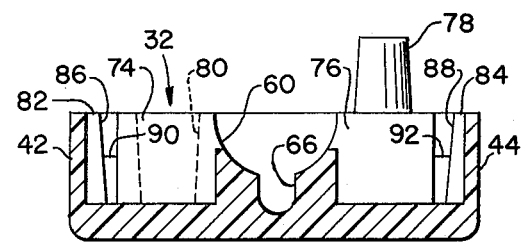
Fig.5
Fig.6
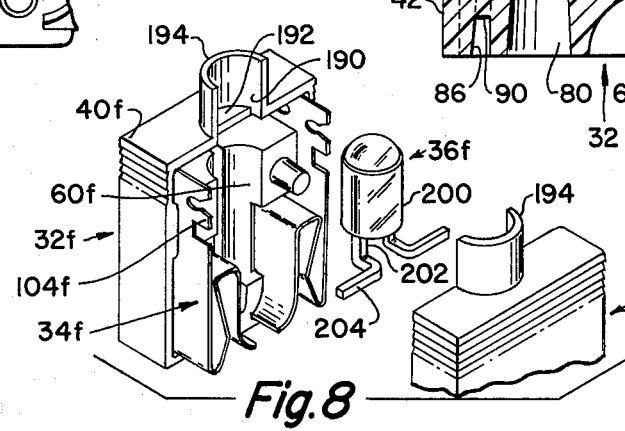
Fig.8

PROTECTIVE ELECTRICAL DEVICE

BACKGROUND OF THE INVENTION

This invention relates primarily to protective devices for use with and for the prevention of damage to the electrical components of key telephone systems. I am aware that a U.S. patent application, Ser. No. 811,293, filed June 29, 1977, is co-pending with mine covering various forms of related devices which it is my understanding will be assigned to Bell Laboratories of Holmdel, New Jersey and Illinois Tool Works Inc. of Chicago, Illinois, the latter being the assignee of this present invention.

Several years ago, telephone companies replaced mechanical relays in key systems with printed circuit boards and semiconductors; this change caused a sporadic rash of circuit failures. A solution to the problem is to install a bleeder resistor from the ring control circuit to a permanent ground. The most feasible place to utilize such a bleeder resistor is in the intermediate terminal blocks utilized on the key telephone relay equipment itself and/or at multiple phone installation interconnecting blocks. Such blocks consist of rows of terminals that are flat, split beam members adapted to accept wire conductors between the split portions of each terminal. It was found that if the resistor connections were pressed into the split terminal, the integrity of the connection to the existing conductor was jeopardized. To wind the lead around the terminal was time consuming and too permanent. An attempt was then made to solder spade terminals to the resistor leads, encapsulate them in epoxy, and apply the spade terminals to the upright split terminals mounted in the terminal block. This was found to be too bulky and prone to being knocked off the terminal board.

A secondary problem exists in that such terminal blocks consist of rows of edge-to-edge terminals with the spacing between adjacent rows varying between different types of blocks used for different sizes of installations. This requires adaptability of connector means for acceptance by a multiplicity of spacings in the rows between terminals in such blocks.

A further problem incurred in the usage of terminal blocks in communication systems is the interruption of service by a serviceman while a call or function is in progress. The use of a warning device to prevent the serviceman from accidentally interrupting a circuit has been found desirable.

BRIEF SUMMARY OF THE INVENTION

The present invention relates to a compact protective electrical device which will be acceptable between adjacent rows of terminals in a communication terminal block and includes a dielectric body having a pair of substantially identical body portions including a plurality of positioning means disposed in predetermined relationship which encloses an electrical component spaced from and connected to spaced contacts within said body with the contacts adapted to accept a variety of predetermined spacings of terminals through end ports in the body. Such a device can serve as a surge protector by connecting a telephone ring circuit in one row of terminals to a second row of terminals to ground with a bleed resister being the electrical component within the device.

A further use of the present device can be as a warning device for use in telephonic circuits whereby a light producing device, such as a light emitting diode, can be connected to a special service circuit as an indicator to prevent servicemen from accidentally interrupting the circuit.

Still another object of the present invention is to provide a device of the type indicated above which can be economically fabricated, will provide a low profile in installed positions, can be installed with ease, readily removed and will not be readily cocked or accidentally dislodged.

Other objects of the present invention will become apparent to those skilled in the art when the specification is read in conjunction with the attached drawings.

BRIEF DESCRIPTION OF THE DRAWINGS

FIG. 3 is an elevational view of one-half of an assembled body with the components in position but without the second half of the body assembled thereto;

FIG. 4 is an elevational view of one-half of the housing of the body;

FIG. 5 is an end view in section taken along line 5—5 of FIG. 4;

FIG. 6 is an end view in section taken along line 6—6 of FIG. 4;

FIG. 7 is an elevational view in partial section showing a secondary embodiment of the contact member;

FIG. 8 is a perspective view of an embodiment of the present invention adapted to accommodate a light emitting diode (LED) for use in a body portion of the type contemplated by this invention.

DETAILED DESCRIPTION

Figure 1:
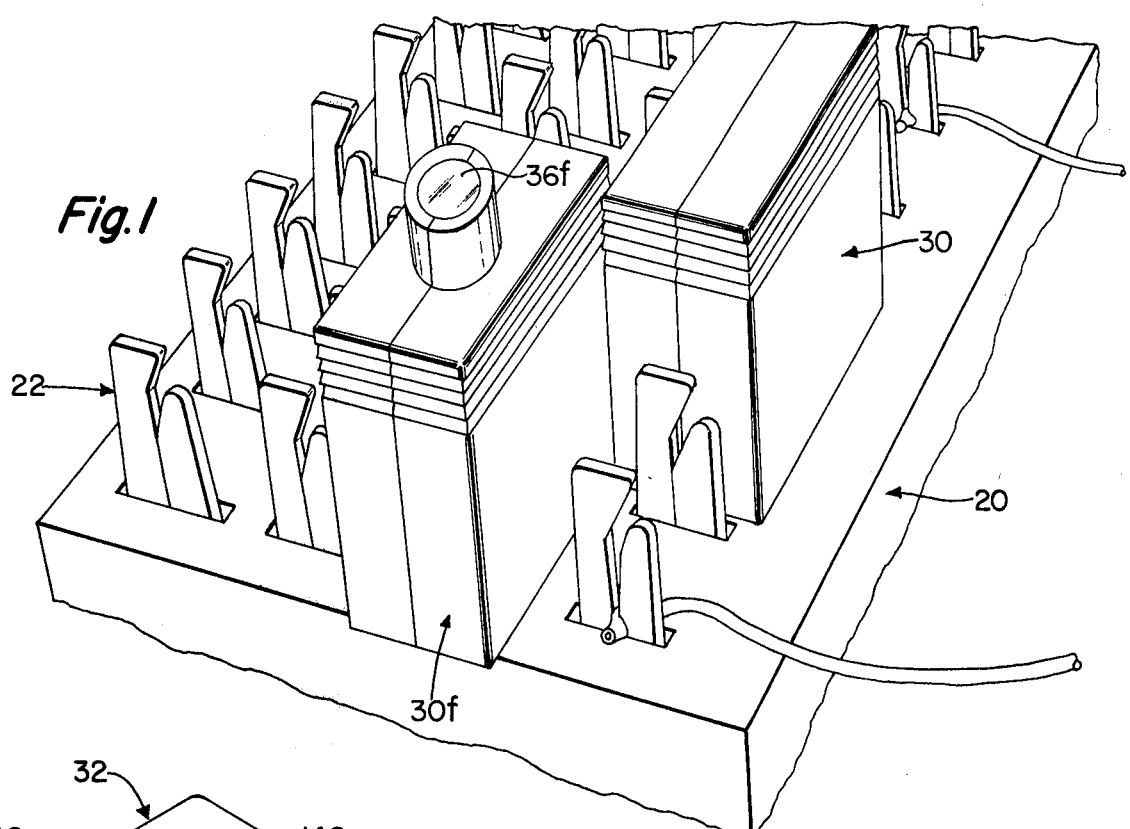
FIG. 1 is a perspective view in partial section of a terminal block with embodiments of the present invention in installed position.

In the communications industry various forms of circuit connection means are utilized. In some forms a patch-cord is used where male and female connectors are used on a temporary or semi-permanent basis, while in the telephone industry it is quite common in the United States to use terminal blocks 20 which include rows of flat slotted beam-like terminals 22 of a well known variety that permit a lead wire to be inserted within the two halves of the terminal to strip the wire and make contact with that terminal. In many instances either an entire row of terminals or a portion of a row of terminals will be interconnected to a common function or circuit, such as supervisory circuit, tip, ring, line hold, lamping, exclusion, intercom, signalling, or ground. As has been previously indicated, it has been found desirable to provide a surge protector by connecting a bleed resistor between the ring control circuit and the ring ground. The present invention relates to a compact assembly consisting of identical halves forming a body portion which, before association, will accept terminals in adjacent rows internally of the device while mounting the electrical component such as a resistor in a vertical position between adjacent rows of terminals. Such a protective device is generally designated by the numeral 30 and includes a body 32, a pair of contacts 34, and an electrical component 36.

Referring now to FIGS. 2 through 6, the body 32 in the present embodiment includes two half portions that are substantially identical for economy in manufacture and ease in assembly. Each half of the body is a generally thin wall box-like configuration substantially rectangular in configuration and having a top 40, side walls 42 and 44, and a bottom 46 having a pair of apertures or ports 48 and 50 spaced apart from one another as well as from the side walls to thereby provide a nose portion 52 and a pair of side ledges 54 and 56 for purposes best set forth hereinafter.

The interior of the box-like body 32 is provided with locating means for orienting the contacts, components and electrical leads. In the present embodiment there is centrally disposed a semi-cylindrical cavity 60 that is axially disposed above the nose portion 52 and terminates adjacent the bottom end by an abrupt shoulder 62 and in space relation with the upper end where it terminates at point 64. A groove or slot 66 communicates with the semi-cylindrical means and extends substantially the entire length of the body or case 32. Between the shoulder 62 and the nose 52 there is provided a substantially solid portion 68 that accommodates the lower portion of the slot 66 as well as providing the radiused slots 70 and 72, for purposes best set forth hereinafter.

Intermediate the extremities of the case there are provided two abutments 74 and 76 extending outwardly from the semi-cylindrical portion in substantially full height of the case walls. The abutment 76 is provided with a tapered post 78 while the abutment 74 is provided with an upstanding tapered bore 80. The abutments 74 and 76 are spaced a substantial distance from the respective side walls 42 and 44 and are confronted by radiused projections 82 and 84 respectively. These projections are tapered from their top to their bottom to form a tapered groove 86 and 88 respectively, with each having a detent or shoulder 90 and 92 respectively, positioned within the bottom of the slot for purposes best set forth hereinafter.

The various positioning means formed by the semi-cylindrical portion, the abutments and projections generally form the central elongated chamber with a pair of side chambers 94 and 96 and a transverse chamber 98 adjacent the upper end of the body or case 32, with the transverse chamber communicating through the slots 86 and 88 with the contact chambers and via the groove 66 and the open end of the semi-cylindrical portion 60 with the central chamber.

It will be appreciated that when a pair of these half configurations are superimposed in facing relationship, the post 78 will be readily accepted within the bore 80 and will readily locate the opposing complementary half of the hollow box-like configuration to form a closed container except for the lower ports 48 and 50, as will be seen hereinafter. The body is generally an injection molded part formed of a dielectric material such as polypropylene or an equivalent material. The two halves can be sonic welded, adhesively joined, or be provided with a force fit between the post and bore or be provided with snap fastening means, not shown, which are well known in the art.

Located within the contact chambers are a pair of contacts 34. Since each of the contacts are identical, the same numerals will be used to designate similar parts. The contacts 34 as shown are fabricated of resilient strip stock having a substantially flat tail-like section 100 that is provided with appropriate means to 102 and 104 opening outwardly through opposite long edges thereof and positioned in spaced relation adjacent one end. The flat blade-like configuration can be construed as having two portions, the fist of which is accepted within one of the slots 86 or 88 with the shoulder 102 cooperating with the detent means 90 and 92 in their respective slots 86 and 88. The portion having the notch 104 projects up into the transverse chamber 98. The slots 104 include a lead-in portion and a terminal radius portion with a diameter capable of accepting and retaining an electrical lead. This upper portion 106 that is retained within the slots 86 and 88 can be construed as being substantially rigid because of its reinforcement. The taper to the slots 86 and 88 permits ready insertion therein and, as will be noted, due to the projections 82 and 84 will tend to space the flat portion 100 away from the respective side walls 42 and 44. Thus, the lower portion 108 can be construed as a flexible sectin since there is room between the side walls and this flat portion to permit lateral movement. At the loer or opposite end of the flat portion 100 the material is radiused as at 110 and bent to diverge outwardly to an intermediate point 112 where it extends inwardly toward but spaced from the flat portion to a second reversely bent area 114 where it engages the undersides of abutmens 74 and 76 in rolling contact. The free end extends toward the bottom or opposite end to form a leg 116 that terminates in a radiused free end 118 which cooperates and is complementary to the radiused surface of solid portion 68 and terminating in the slots 70 and 72 where the free end of the radiused portion 118 is captured in adjustable sliding relationship.

As was previously mentioned, in the telephone industry, terminal blocks are utilized which have varying spacing between different types of blocks. For example, the spacing in an "M" block between adjacent rows of terminals is approximately 0.200 inches, while in a "B" block the spacing between adjacent terminals is approximately 0.250 inches. This is generally represented by the terminals shown in phantom in FIG. 3 where it can be visualized that the "M" block will be immediately accepted within the contacts 34 in the position shown in solid lines. The opening in the ports 48 and 50 will accept the wider spacing of a "B" block terminal rows by contacting the diverging portion between 110 and 112, swing the flexible portion 108 towards the wall and make contact at at least the bend point 112 with the terminals in the "B" block. When the larger "B" block spacing is used, there will be a tendency for a rolling action at the radiused portion 114 and some movement of the radiused portion 118 to move the "S" shaped contact laterally toward the side walls 42 and 44.

Figure 2:
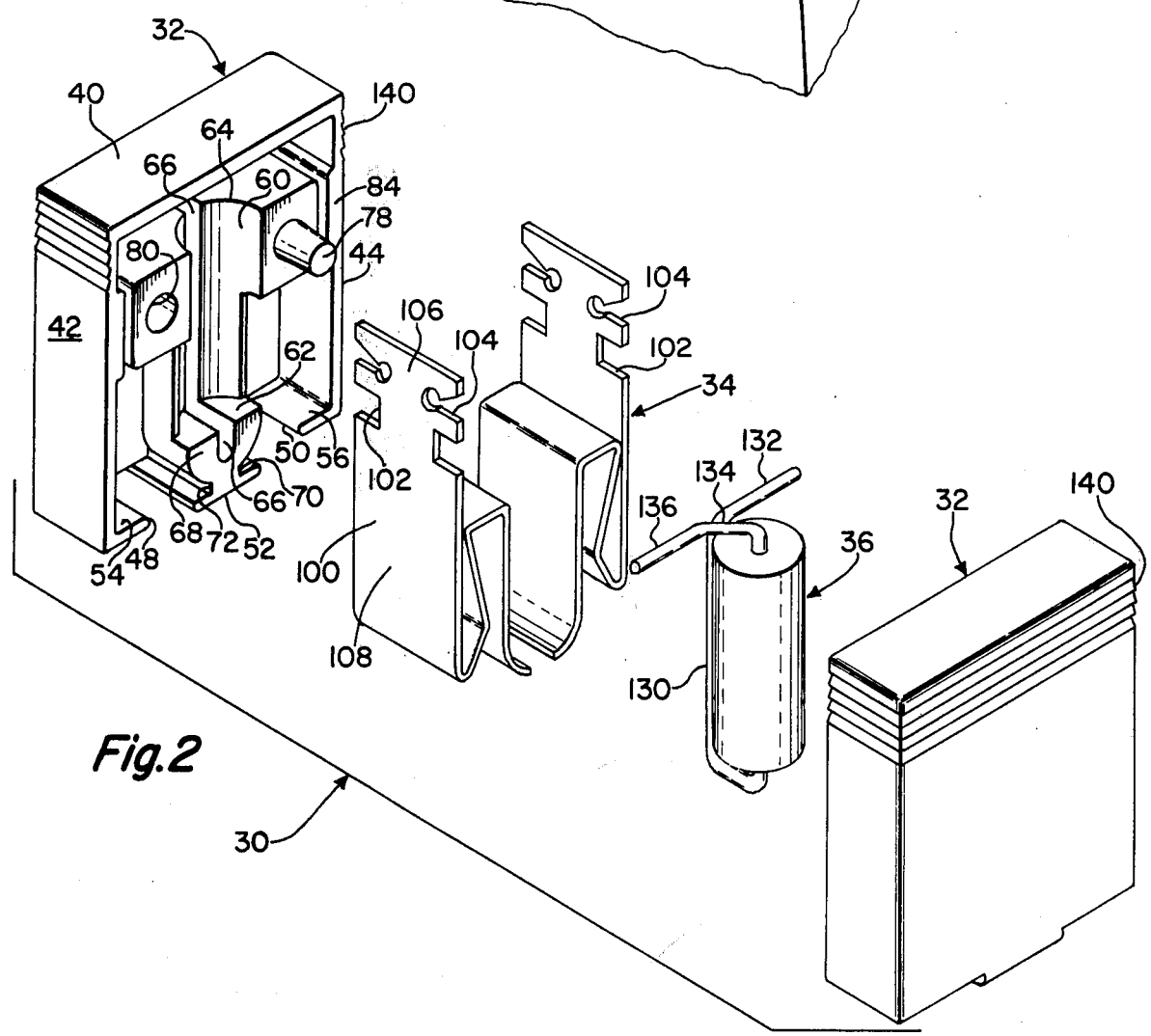
FIG. 2 is an exploded perspective view of the components making up the present invention.

As one example of an electrical component, this embodiment, as seen in FIGS. 2 and 3, includes a resistor of a generally cylindrical variety having a pair of leads extending axially out of opposite ends of the resistor. The diameter of the resistor is complementary and acceptable within the cylindrical recess 60. The lead at the lower end is bent in a lateral and reverse direction to parallel the body of the resistor and is accepted and captivated within the slot 66 opening into the cylindrical recess 60. When the lateral lead 130 reaches the upper extremity of the resistor, it is bent at right angles thereto to form a connector 132. The opposite lead 134 is bent angularly outwardly to be co-planar as at 136 with the portion 132 of the other lead. The portions 132 and 136 are inserted into and captured by one of the solderless connection slots 104 within the transverse chamber 98. In this fashion the resistor 36 is positioned axially by engagement with the shoulder 62 at the base of semi-cylindrical recess 60 and with its leads 132 and 136 being in engagement with the connection slots 104, the contact slots 102 restraining axial movement by engagement with the detent shoulder meas 90 and 92 insures positive placement of the electrical component. It will be appreciated that the leads 132 and 136 can either be positioned on the same edges of the contacts 34 or may be positioned on opposite edges falling in a common plane in the installed contact position. Thus, those skilled in the art will appreciate that the contacts and electrical components may be readily and rapidly assembled with one-half of the body 32 while the second half being identical will accept the slots 102 within its slots 86 and 88 and with its tapered post 78 being trapped in the tapered bore 80 of the first half of the body. Methods of assembling and retaining the two body halves in permanent associated relationship have been previously described. It should also be noted that for ease in gripping the body can be provided with suitable means such as the parallel serrations 140 adjacent the upper end.

Referring now to FIG. 7 wherein similar parts are designated by similar numerals, with the addition of the suffix "a", the contact 34a includes a flat rigid portion 106a captured by the abutment 76a and projection 84a and thence extends downwardly to an intermediate point where it is provided with a generally parabolically curved side wall 150. The remainder of the substantially "S" shaped double reversed bent contact portion 110a through 118a is substantially related to the first embodiment. The use of the parabolic curved side wall is an example of a means to provide for compensation of the deflection due to center distance variation between terminals to be accepted within the ports leading into the contact chambers.

Referring now to FIG. 8 wherein similar numerals are utilized to designate similar parts with the addition of the suffix "f", there is shown a pair of body portions 32f which would be adapted to accept a LED having a pair of leads 204. The basic configuration of the body 32f is substantially identical to the prior embodiments heretofore discussed with the exception that the upper end 40f of the body 32f includes a third port 190 that includes a transverse shoulder 192 which, when the two halves of the body are brought together, form a generally slot-like port having a predetermined width as measured between the confronting edges of the shoulders 192. Extending upwardly around the port 190 and the shoulder 192 is a semi-cylindrical sleeve 194 having a predetermined axial length. The illuminating device contemplated, 36f, is substantially cylindrical and complementary in shape to the two semi-cylindrical halves of sleeve 194 and has a predetermined axial length equal to or slightly greater than the sleeve portions 194. It will be seen that the leads which extend from the LED would be bent at right angles to form a laterally extending portion capable of being accepted in the contact slots 104f. The axially extending portion 202 of the leads are grasped and retained by the confronting edges of the shoulder 192 when the two body portions are brought into final position to provide a strain relief function by the structure provided.

Reading of this application will reveal that the present invention contemplates an economical assembly of compact nature provided by a two-piece dielectric case devised for enclosing and supporting a pair of contacts and means to accept a protective or warning device, depending on the selection of the electrical component, in terminal blocks of the type utilized in the communications or electrical industry. While an embodiment of the body or case has been illustrated, both for accepting a protective device or a warning device, other forms will be apparent to those skilled in the art.

I claim:

1. A protective electrical device adapted for use with electrical wiring terminal blocks having adjacently positioned elongated metallic terminal means, said device including a substantially rigid dielectric body means, two contact means, and an electrical component means connected to said contact means, said body means consisting of a pair of body portions including a plurality of positioning means for separating and retaining said contact and component means in predetermined relationship as if in spaced chambers, positioning means in said chambers for cooperative retention of said contacts that fixes one end of each of said contacts and permits lateral adjustability of each of the opposite ends of said contacts, each of said contacts being provided with cooperative means adjacent said one end complementary to shoulder means serving as said positioning means in each said chamber adapted to locate and retain said contact in fixed axial relation to said body, a transverse chamber adjacent one end of said body means communicating with said contact and component means positions, and electrical connection means traversing said transverse chamber between said contact and component means, said body means further including spaced port means opening through said body means adapted with said contact means to accept a variety of predetermined spacings of said terminal means.

2. A device of the type claimed in claim 1 wherein each of said contacts is formed from a flat strip of sheet material including a flat tail portion which adjacent one end carries connector means for engaging said electrical connection and said tail portion further carrying said cooperative means, a first resilient reversely bent portion connected at the opposite end of said tail portion and extending away from and thence towards said tail portion, one end and a second reversely bent portion extending in the same axial direction as said opposite end and forming an adjustable open throat between said retaining means adapted for cooperation between the free end of said second portion and said body means, said retaining means including slot means in said body adjacent to said port means with the free end of said second portion adjustably captured in said slot means whereby said open throat presents a laterally adjustable smooth surface for introduction and capture of said terminal means.

3. A device of the type claimed in claim 2 wherein said two body portions are identical mating parts with complementary positioning means when brought into close relationship.

4. A device of the type claimed in claim 1 wherein said body means is substantially rectangular with said transverse chamber extending along one narrow end and with said spaced ports opening through the opposite end, a centrally disposed substantially cylindrical positioning means adapted to accommodate an elongated complementary cylindrical electrical component, chamber means positioned laterally on opposite sides of the axis of said cylindrical positioning means for accommodating said contact means and communicating with said port means, slot means communicating between said contact chambers and said transverse chamber, lead accommodating means associated with said cylindrical positioning means to provide access for electrical connections from said electrical component through said transverse chamber to said contacts whereby a circuit can be established, said body means further including secondary port means opening through a side other than the side having the contact port means, said secondary port means provided with strain relief means and capable of accommodating and permitting viewing of a light emitting component.

5. A device of the type claimed in claim 4 wherein said body secondary port means opening through a side other than the side having the contact port means includes an axially outwardly extending shield surrounding said secondary port means which is substantially co-axial with said cylindrical positioning means, abutment means positioned within said shield and adapted to serve as axial locating means for said light emitting component and to position and restrain the electrical connections as they extend into said transverse chamber.

6. A device of the type claimed in claim 1 wherein said body means is substantially rectangular with said transverse chamber extending along one narrow end and with said spaced ports opening through the opposite end, a centrally disposed substantially cylindrical positioning means adapted to accommodate an elongated complementary cylindrical electrical component, contact chamber means positioned laterally on opposite sies of the axis of said cylindrical positioning means and axially spaced from said transverse chamber for accommodating said contact means and communicating with said port means, slot means communicating between said contact chamber means and said transverse chamber, axially disposed lead accommodating slot means associated with said cylindrical positioning means to accept and provide access for axially disposed electrical connections from said electrical component to and through said transverse chamber to said contacts whereby a circuit can be established.

7. A device of the type claimed in claim 6 wherein said contacts are folded strip material and each including a notched flat tail portion acceptable within said slot means and extending between said contact and transverse chambers, detent means within said slot means complementary to and acceptable within notch means in said tail portion, a double reversely bent "S"-shaped portion positioned within said contact chamber and providing a smooth surface laterally adjustable open throat for accepting in a variety of positions said elongated metallic terminal means which are substantially blade-like in configuration, the free end of said S-shaped portion being adjustably captured in means centrally disposed in said body means adjacent said port means.

8. A device of the type claimed in claim 7 wherein said tail-like portion of said contact is restrained only adjacent one end thereof while a substantial portion thereof is positioned in spaced relation to the wall of said contact chamber to permit lateral flexing thereof to accommodate said variety of predetermined positions of said blade-like terminal means.

9. A device of the type claimed in claim 7 wherein said tail-like portion is restrained only adjacent one end thereof while a substantial portion thereof beyond such restraint is curved substantially parabolically away from said body side wall before said double reverse S-shaped curve.

10. A device of the type claimed in claim 7 wherein the free end of said bent S-shaped portion is bent laterally away from the open throat, said means for capturing said free end includes a curved wall on the end of the central positioning means adjacent to said port means and a T-shaped extension forming slot means on opposite sides of the axis of said cylindrical positioning means with said slots being defined by said curved surface and the cross bar of the T-shaped extension, said cross bar further defining the end wall of said body means adjacent said port means, thereby insuring that said elongated terminal means will always contact a smooth surface of said laterally adjustable open throat when introduced into said port means.

* * * * *